No. 775,015. PATENTED NOV. 15, 1904.
T. STRAIN.
FRUIT GRADER.
APPLICATION FILED JAN. 12, 1903.
NO MODEL. 3 SHEETS—SHEET 2.
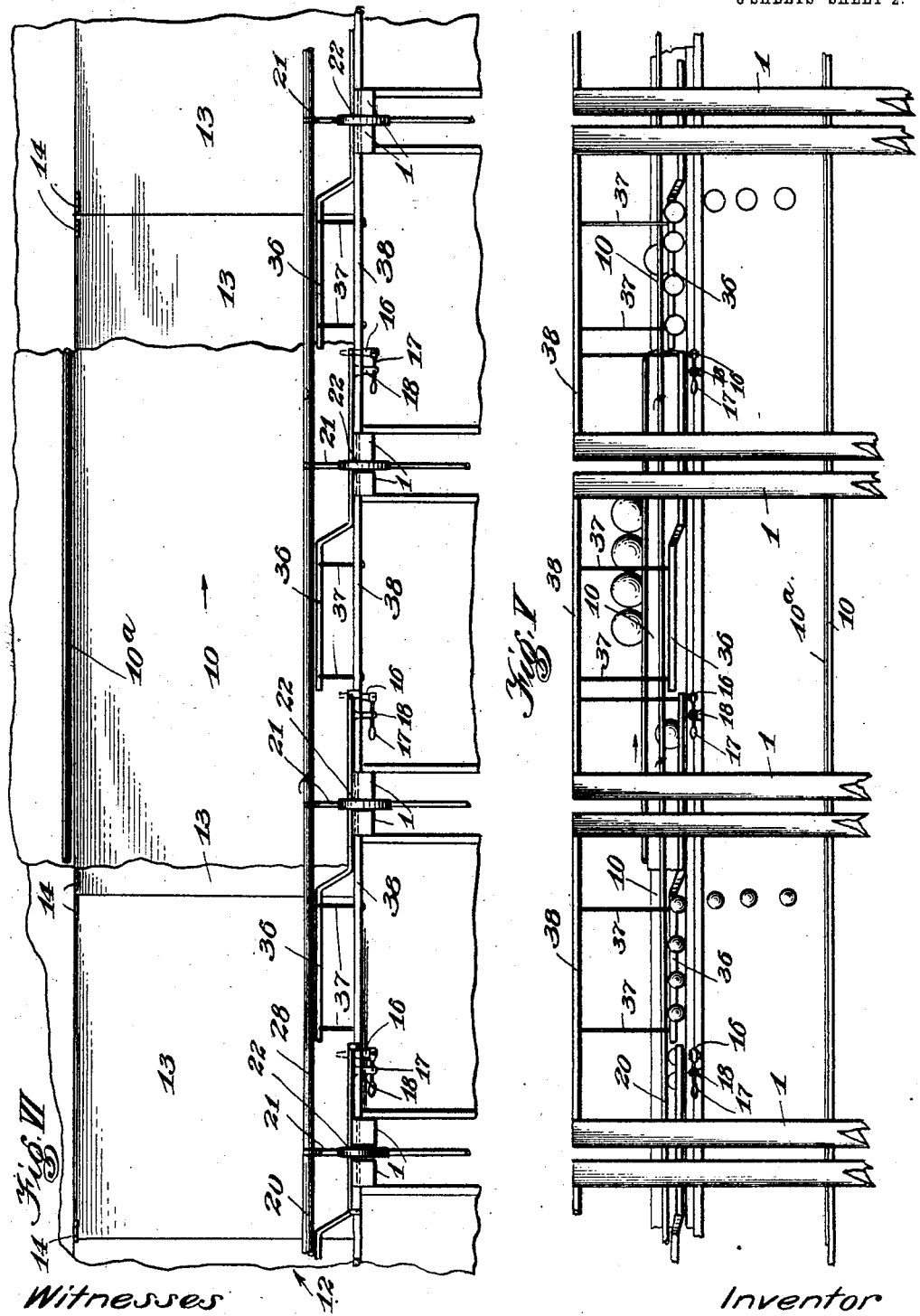
Witnesses
Inventor
Thomas Strain No. 775,015. PATENTED NOV. 15, 1904.
T. STRAIN.
FRUIT GRADER.
APPLICATION FILED JAN. 12, 1903.
NO MODEL. 3 SHEETS—SHEET 3.
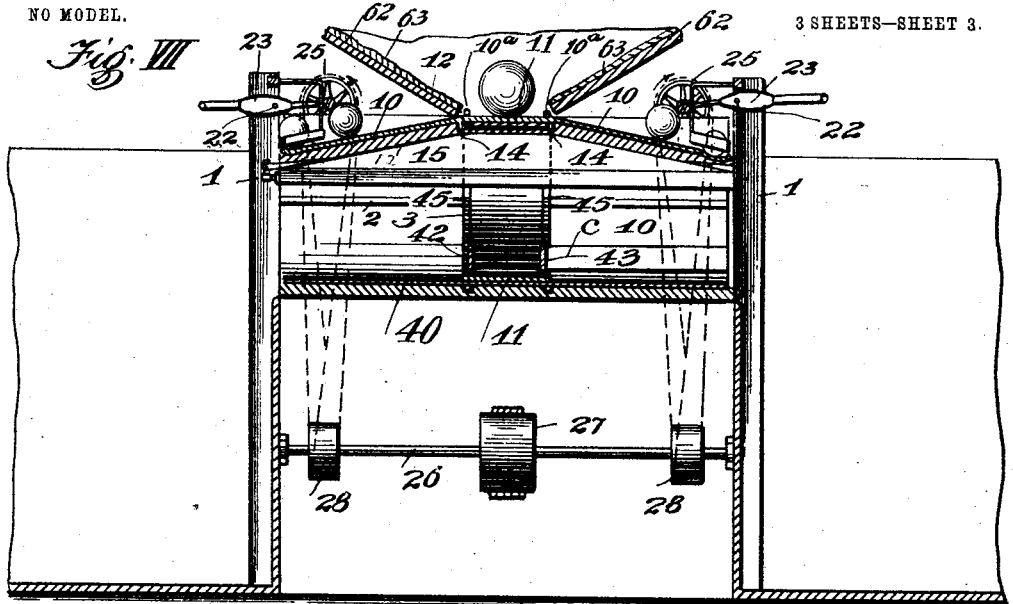
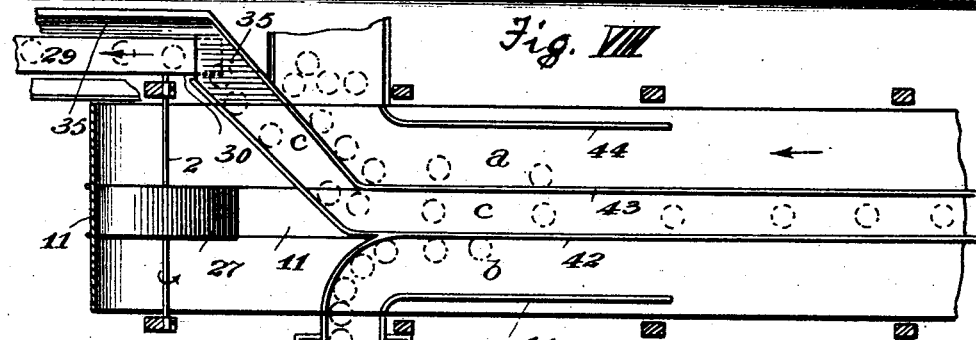
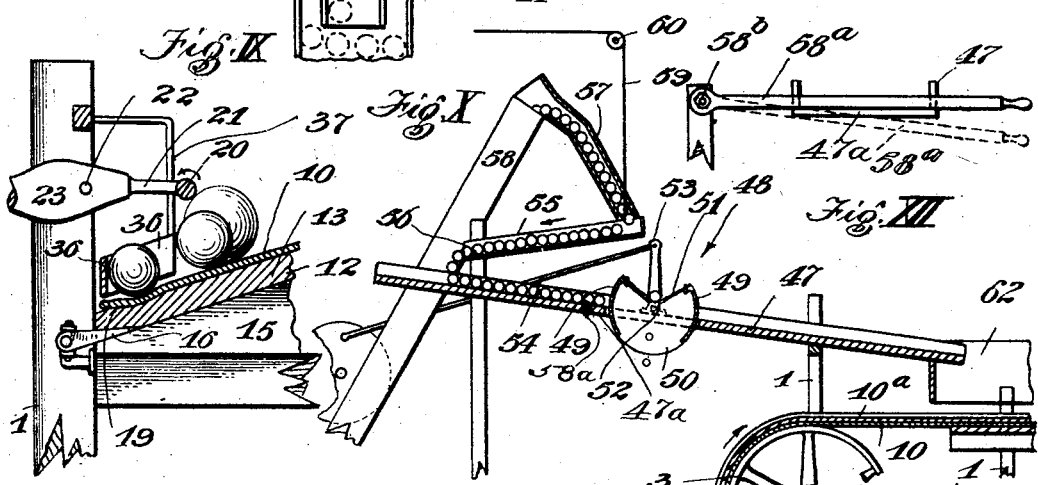
Witnesses
Inventor
Thomas Strain
by Townsend Bros
his attys No. 775,015.  Patented November 15, 1904.

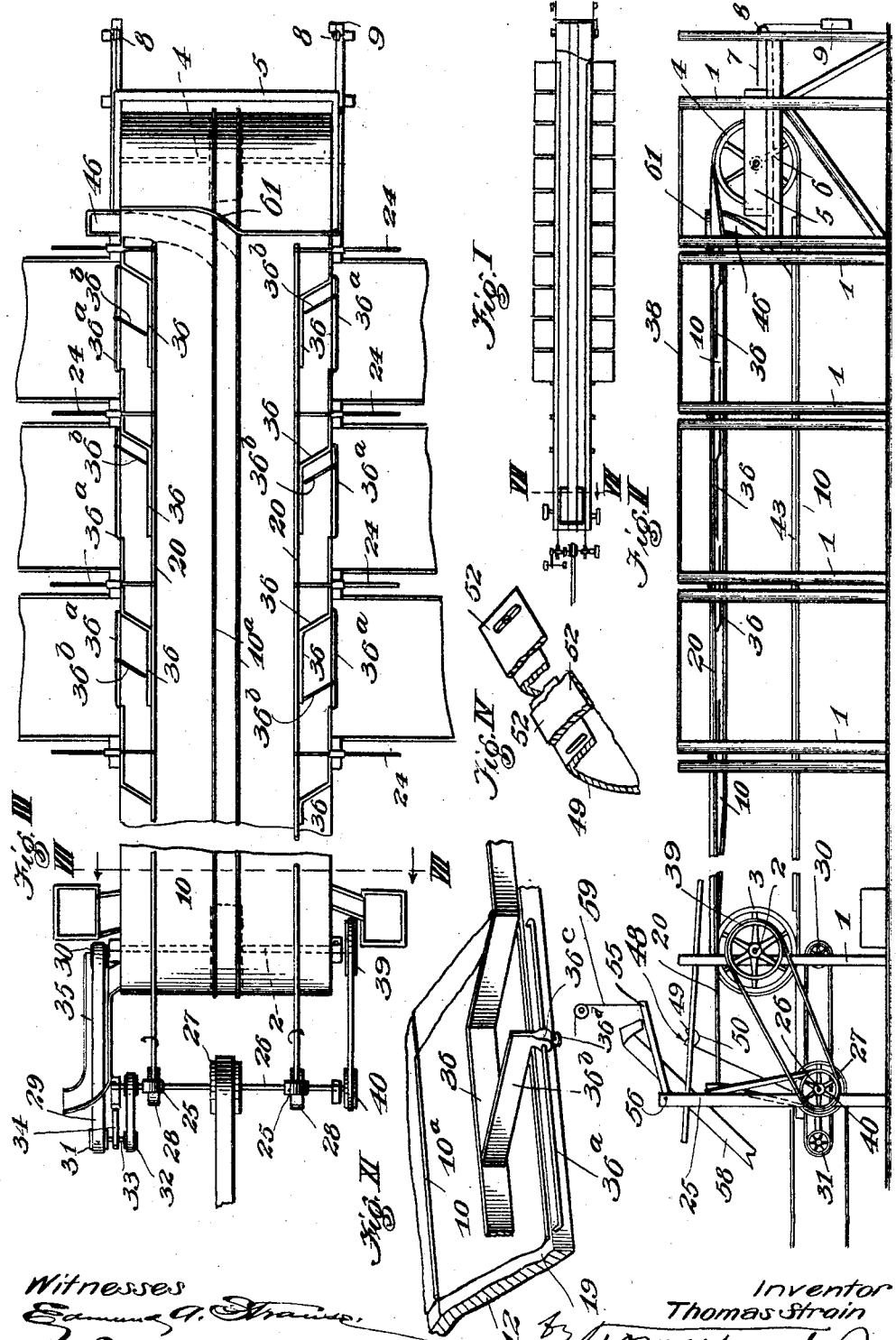

UNITED STATES PATENT OFFICE.

THOMAS STRAIN, OF PLACENTIA, CALIFORNIA.

FRUIT-GRADER.

SPECIFICATION forming part of Letters Patent No. 775,015, dated November 15, 1904.

Application filed January 12, 1903. Serial No. 138,752. (No model.)

*To all whom it may concern:*

Be it known that I, THOMAS STRAIN, a citizen of the United States, residing at Placentia, in the county of Orange and State of California, have invented a new and useful Fruit-Grader, of which the following is a specification.

My invention relates to a machine by means of which different sizes of fruit may be gaged and sorted or separated into bins.

One object of my invention is to provide a fruit-grader which will effectively grade the fruit without damaging the fruit.

Another object of my invention is to provide means whereby the fruit will be thoroughly mixed or delivered into each bin in such a way that the several sizes of fruit in each bin are perfectly distributed. This is a valuable feature, for the reason that although the average size of fruit in different bins will vary, still the actual size of fruit delivered into each bin will also vary somewhat.

Briefly, my invention consists of means for conveying the fruit along an inclined surface and means arranged along the inclined surface to hold fruit of certain sizes at certain points on the inclined surface and to allow certain sizes of fruit to escape at certain points along the inclined surface.

Referring to the drawings, Figure I is a diagrammatical plan view which shows the general arrangement of the fruit-grader. Fig. II is a side elevation of the conveyer, showing only a few bins. Fig. III is a plan view of what is shown in Fig. II. Fig. IV is a detail of a fragment of part of the feed-regulator. Fig. V is an enlarged side elevation of a section of the elevator, showing three bins. Fig. VI is a plan view of what is shown in Fig. V. In this view only one side of a portion of the elevator has been illustrated. Fig. VII is an enlarged section taken on the line VII VII, Fig. III. Fig. VIII is a plan view, partially in section, of the lower part of the feeding end of the grader. In this view the lower half of the belt is shown. Fig. IX is a transverse sectional view of a portion of one side of the upper part of the grader. Fig. X is a detail of part of the feeding device. Fig. XI is a perspective view of a guard and adjustable deflector. Fig. XII is a detail of a device for regulating the flow of fruit through the feeding-trough.

1 designates a supporting-frame. The length of the frame will be dependent upon the number of bins employed in the grader. It should be understood that only a few bins are shown in the drawings and that as many bins may be used as desired. Mounted at one end of the frame is a shaft 2, upon which is mounted a pulley 3. At the other end of the frame a pulley 4 is mounted on a shaft journaled in a frame 5, the frame 5 being slidably mounted on horizontal bars 6, supported by the frame 1.

7 is a flexible connection attached to the frame 5 and passes over an antifriction device 8, carried by the frame 1.

9 is a weight carried by the flexible connection 7.

10 is a conveyer-belt which has secured in any suitable manner along it inner middle face a narrow reinforcing strip or belt 11, which latter is mounted upon the pulleys 3 and 4. The conveyer-belt 10 is relatively very much wider than the strip 11.

12 is a table having a middle portion which is horizontal and having sides which are inclined or sloping along each side of the center horizontal part. The central flat part is provided with a slight longitudinal recess in which loosely rides the belt 11. The inclined part of the table 12 is made in sections consisting of a series of hinged leaves 13, each leaf being hinged to the center portion of the table, as at 14.

15 represents cross-bars carried by the frame 1. 16 designates wedges which are interposed between the outer edges of the leaves 13 and the cross-bars 15. Each wedge 16 is connected to a lever 17, the lever 17 being pivoted to a bracket 18. By manipulating the lever 17 and moving the wedges 16 in or out the leaves 13 may be raised or lowered and given a greater or less inclination, as desired.

The belt 10 is supported upon the upper surface of the table 12. Each leaf near its outer edge is provided with a concave depression 19.

20 designates grading-rods arranged along opposite sides of the grader, each rod being rotatably mounted on adjustable arms 21. Each arm 21 is pivoted to the frame 1, as at 22. Each arm 21 is provided with an enlargement 23, one face or side of which is normally in close contact with the frame 1 to afford sufficient friction for holding the arm 21 in the position in which it is placed, the friction produced being sufficient to hold the arm in the desired position. The grader-rods 20 should be long enough to reach to the end of the conveyer. The grading-rods are comparatively slender, as shown, and are flexible to a considerable extent and are supported at intervals by the arms 21, so that any section of a grading-rod may be adjusted relatively to the conveyer. For instance, an intermediate section may be adjusted to the desired height above the conveyer without disturbing the adjustment of the other sections. When each section of the grading-rods has been adjusted, as desired, a grading-rod may not be straight, but the flexibility of the rods and comparatively slow speed at which they run permit of such adjustment. The general line of a grading-rod is of course inclined to the conveyer, but the arms 21 are provided so that when they are adjusted each section of a rod lying between adjacent arms may be substantially parallel with the conveyer. The grading-rods are provided with pulley 25 at one end.

26 is a driving-shaft mounted on the frame 1 and driven by a pulley 27.

28 represents pulleys mounted on the driving-shaft 26, each of which is connected with a pulley 25 by crossed belts.

The grading-rods 20 revolve in opposite directions, and the movement of the lower face of the rod is always away from the lower plane of the inclined leaves. This movement prevents fruit from being drawn in under the rods and squeezed against the conveyer-belt. The fruit does not pass under the rods until the space reached is just large enough for the fruit to pass through easily.

29 designates an auxiliary conveyer-belt which is mounted on pulleys 30 and 31. The pulley 31 is connected to another pulley, 32, by a shaft 33, which latter is mounted on a bracket 34. The pulley 32 is driven by a belt from the pulley on the shaft 26. Arranged at each side of the belt 29 are sloping side plates forming a trough 35.

36 designates guards which are supported by rods 37, which are suspended from bars 38. The guards 36 are suspended in such a way that they lie close to the conveyer-belt and yet do not touch the belt, and as the fruit passes under the grading-rods at different points it is shunted by the guards 36 into the proper bins. The guards 36 are arranged along each side of the conveyer-belt, one guard for each bin.

$36^a$ represents brackets attached to the edges of the leaves. Mounted on each bracket is an inclined deflector $36^b$. The deflector $36^b$ is provided with a lug $36^c$, and the latter is adjustably mounted on the bracket $36^a$ and clamped thereto by means of a set-screw $36^d$. The deflector $36^b$ may be placed at any desired point along the bracket $36^a$, so that fruit will be shunted into the bin at any desired point. This allows the fruit to be delivered into the bin in such a way that it is thoroughly mixed. If the fruit were delivered into the bin direct from under the grading-rods, the size of fruit in the bin at one extreme side would be larger than the size at the other side. To obviate this difficulty, I employ the guards 36 and deflector $36^b$, by means of which the fruit is thoroughly mixed in the bin, and no particular size occupies a particular place in the bin, as would be the case were the guards and deflectors not employed.

39 designates a pulley on the shaft 2.

40 designates a pulley on the shaft 26.

The pulleys 40 and 39 are connected by a belt.

41 42 43 44 designate walls which are supported by rods 45. The rods 45 are carried by cross-bars 15. The walls 41, 42, 43, and 44 are suspended above the bottom part or run of the belt 10 in such a way that they lie close to the belt and yet do not touch the belt. These walls provide three troughs $a$ $b$ $c$. Troughs $a$ and $b$ provide for guiding into suitable bins the fruit that is removed by the sorters from the conveyer-belt. The troughs $a$ and $b$ are merely of sufficient length to extend along that portion of the length of the grader which is devoted to the sorters. In a fruit-grader which is thirty feet long this space devoted to the sorter may be about one-third. The middle trough $c$, as shown in Figs. II and III, communicates, through the medium of a trough 46, with the upper surface of one side of the conveyer-belt 10. The other end of the trough $c$ is offset and terminates in the trough 35.

47 designates an inclined trough arranged over the feeding end of the grader. In the center of the trough 47 is an oscillatory feed-regulator 48, formed of segmental plates 49, which plates are connected together by pieces 50, the feeder being pivotally mounted at 52 to the trough 47.

51 designates plates which are adjustably attached at angles to the segmental plates 49. The plates 51 are spaced apart at their adjacent edges, the space being sufficiently small to retain fruit which it is desired to have pass through the grader and yet will allow fruit which is very much undersized and which it is not desired to grade to drop through the space and be discharged.

The feed-regulator 48 is provided with an upright arm 53, which may be connected with any rotatable part by means of a rod 54. Arranged above the trough 47 is a tilting table 55, pivoted at 56.

57 is a trough which extends from the upper end of the fruit-elevator 58 to the tilting table 55.

59 is a flexible connection from the free end of the tilting table 55, which passes over a pulley 60 and may be connected with a prime feeding device which is not shown in the drawings. When the tilting table 55 becomes filled with fruit, the weight of the fruit causes the table to tilt downward, which pulls on the flexible connection 59, and the latter controls the action of the prime feeding device. (Not shown in the drawings.) The fruit is discharged from the tilting table 55 into the trough 47 and rolls down the same till it comes in contact with the feed-regulator 48. It stays in that position until the feed-regulator is rocked into such position that the plate 52 is brought into a position that allows the fruit to roll up onto the plate 52 and into the V-shaped portion of the feed-regulator. The feed-regulator after being filled is gradually rocked into the position shown in Fig. X and continues until the fruit in the regulator is discharged therefrom into the lower part of the trough. The fruit in the trough 47 is prevented from entering the feed-regulator by reason of the curved segmental plate 49. Any fruit which has been admitted to the feed-regulator which is undersized will fall through the opening between the two plates 52.

58$^a$ is a bar which is pivoted at 58$^b$ to the trough 47 and lies transversely of the trough, the trough 47 being slotted, as at 47$^a$, to receive the bar 58$^a$. By swinging the bar 58$^a$ into or out of the trough the fruit may be stopped or allowed to travel. When the fruit is stopped thereby, the fruit piles up and accumulates on the tilting table, causing the same to operate and shut down the prime feeding device. (Not shown.)

In operation fruit is delivered onto the conveyer-belt 10 from the trough 47. The fruit is carried along on the conveyer-belt 10 between the ridges 10$^a$, extending longitudinally on the outer face thereof. Sorters who stand along both sides of the grader near the feeding end pick out what fruit is not suitable for packing and place such fruit in the troughs $a$ and $b$, and this fruit is conveyed by the lower part of the belt through the troughs $a$ and $b$ and delivered into suitable bins. The sorters pick off good fruit from between the ridges 10$^a$ and place it on each of the inclined sides of the belt, where the fruit rolls down against the grading-rods 20 and is carried along the grading-rods 20. The space between the grading-rods and the belt 10 gradually varies, so that the larger fruit is carried by the conveyer-belt to the farther end of the grader and the small fruit is allowed to escape under the grading-rods at a point much closer to the feeding end of the machine. Intermediate sizes of fruit will escape under the rods at intermediate places along the rod. It will be observed that by reason of the rotation of the rods 20 the fruit is prevented from becoming pinched between the rods 20 and belt 10, the rotation of the rods being in a direction which does not tend to draw the fruit under the rods. It will be seen that the fruit is carried to the utmost limit as determined by the space which will allow or retain the fruit on the conveyer-belt 10. When a certain size fruit is discharged under the rod 20, which can only occur at clear spaces between consecutive guards 36, it rolls down the inclined belt and rest against the lower section of a guard 36. (See Fig. IX.) When the fruit is in contact with the guard 36, it rests in the concave hollow depression 19.

The guard 36 serves to hold the fruit from being delivered into the bin until the belt has traveled a sufficient distance to bring the fruit to the desired point opposite the bin, at which point the deflector 36$^b$, which stands in front of the offset inclined part of the next guard, shunts the fruit into the bin. The hollow depression holds the fruit on the conveyer-belt after the fruit has passed under the grading-rods before being shunted by the guards. Fruit that is not removed by the sorters from the central portion of the belt is carried to the farther end of the grader, where it is deflected by means of the grader 61 and delivered into the trough 46, down through which the fruit rolls, being discharged onto the lower part of the belt 10, falling into the trough $c$. The fruit is conveyed back to the feeding end of the grader by the lower part of the belt and is guided by the trough $c$ into the trough 35, and from the latter it is delivered onto the auxiliary conveyer-belt 29, which carries it rearward to the elevator 58, the connection between this conveyer and elevator is not shown in the drawings.

The space between the rods 20 and the conveyer-belt may be adjusted in two ways—either by raising or lowering the grading-rods 20 by means of the arms 21, or by raising or lowering the leaves 13 by moving the wedges 16 in or out by manipulation of the levers 17. The latter method is preferable for the reason that it does not throw the grading-rod 20 out of its natural alinement. It should be understood that as the grading-rod 20 is slender it permits of being adjusted within reasonable limits—that is, it permits being thrown out of straight alinement. By raising and lowering the leaves 13 accurate adjustment of space may be secured for each section of the grader. It should be understood that the movement of the leaves or of the rods 20 when being adjusted is very slight, comparatively, and that the guards 36 are arranged a sufficient distance above the conveyer-belt to allow the desired movement in adjusting the leaves.

Referring to Fig. VII, 62 designates a trough formed of inclined plates provided on their upper surfaces with padding, such as 63, these serve to guide and soften the fall of the fruit from the trough 47 onto the conveyer-belt 10, the oranges in falling strike the padded portion 63, which prevents the fruit being bruised.

It should be understood that I contemplate making such changes and alterations in the herein-described embodiment as will come within the scope of my invention.

What I claim, and desire to secure by Letters Patent of the United States, is—

1. A fruit-grader comprising means for conveying fruit along a definite line of travel, said means being inclined transversely of the line of travel, an inclined grading-rod lying along said line of travel above said conveying means, and means for adjusting intermediate sections of the grading-rod relatively to the grading-rod.

2. A fruit-grader comprising means for conveying fruit along a definite line of travel, said means being inclined transversely of the line of travel, an inclined grading-rod lying along said line of travel above said conveying means, a series of arms supporting said grading-rod at intervals, means for supporting said arms, and means for frictionally holding said arms in a desired position.

3. A fruit-grader comprising means for conveying fruit along a definite line of travel, said means being inclined transversely of the line of travel, a table for supporting said inclined conveying means, an inclined grading-rod lying along said line of travel above said conveying means, means for rotating said grading-rod, and means for supporting said grading-rod embracing an arm pivoted between said pair of bars and a bolt passing through said bars and arm.

4. A fruit-grader comprising means for conveying fruit along a definite line of travel, said means being inclined transversely of the line of travel, a table for supporting said conveying means, a plurality of pairs of upright bars supporting the table, an arm pivoted between each pair of bars, an inclined grading-rod lying along said line of travel above said conveying means, said rod being rotatably mounted in said arms and means for rotating said rod.

5. A fruit-grader comprising traveling means for conveying fruit along a definite line of travel, said means embracing movable opposite inclined portions and flexible means for retaining fruit on each of said inclined portions and lying along said line of travel above said conveying means and having its axis inclined.

6. A fruit-grader comprising traveling means for conveying fruit along a definite line of travel, means embracing movable opposite inclined portions the inclination of each portion being transverse of the line of travel, a plurality of flexible inclined grading-rods, each rod lying along said line of travel above said conveying means, and means for rotating said grading-rods.

7. A fruit-grader comprising traveling means for conveying fruit along a definite line of travel, means embracing movable opposite inclined portions, the inclination of each portion being transverse of the line of travel, a plurality of flexible inclined grading-rods, each grading-rod lying along said line of travel above said conveying means and means for rotating said grading-rods in opposite directions.

8. A fruit-grader comprising traveling means for conveying fruit along a definite line of travel, means embracing movable opposite inclined portions, the inclination of each portion being transverse of the line of travel, a plurality of flexible grading-rods, each grading-rod lying along said line of travel above said conveying means, and means for rotating said grading-rods in opposite directions, the directions of rotation of each rod being such that the moving under surface of each rod is substantially directed away from the lower plane of its adjacent inclined portion of said conveying means.

9. A fruit-grader comprising means for conveying fruit along a definite line of travel embracing an endless belt, means for supporting opposite sides of said belt in symmetrical inclined positions, means for gaging fruit on said inclined portions of said belt and lying along said line of travel above said belt, said latter means having their axes inclined in the same direction.

10. A fruit-grader comprising means for conveying fruit along a definite line of travel, said means embracing an endless belt, means for supporting opposite sides of said belt in symmetrical inclined positions, a plurality of grading-rods, each rod lying along said line of travel above said belt, both grading-rods being inclined in the same direction, and means for rotating said grading-rods.

11. A fruit-grader comprising means for conveying fruit along a definite line of travel, said means embracing an endless belt, means for supporting opposite sides of said belt in symmetrical inclined positions, a plurality of grading-rods, each grading-rod lying along said line of travel above said belt, both grading-rods being inclined in the same direction, and means for rotating said grading-rods, the direction of movement of both rods being such that the moving under surface of each rod is substantially directed away from the lower plane of the inclined parts of said belt.

12. A fruit-grader comprising a frame, a table consisting of a horizontal central portion having a plurality of opposite hinged leaves, means for supporting said leaves in a desired position, an endless belt, means for propelling said belt longitudinally over said table, and means for retaining fruit on said belt and lying along said line of travel above said belt and having its axis inclined.

13. A fruit-grader comprising a frame, a table consisting of a horizontal central portion having a plurality of opposite hinged leaves, means for supporting said leaves in a desired position, an endless belt, means for propelling said belt longitudinally over said table, means for retaining fruit on said belt and lying along said line of travel above said belt and having its axis inclined, and means for adjusting each of said leaves independently of the others.

14. A fruit-grader comprising a frame, a table consisting of a horizontal central portion having a plurality of opposite hinged leaves, means for supporting said leaves in a desired position, an endless belt, means for causing said belt to travel longitudinally over said table, means for gaging fruit on said belt, and lying along said line of travel above said belt and having its axis inclined, cross-bars on said frame under each leaf, a wedge interposed between each leaf and each cross-bar and means for adjusting said wedges.

15. A fruit-grader comprising a frame, a table consisting of a horizontal central portion having a plurality of opposite hinged leaves, means for supporting said leaves in a desired position, an endless belt, means for causing said belt to travel longitudinally over said table, and means for retaining fruit on said belt, and lying along said line of travel above said belt and having its axis inclined, a plurality of cross-bars on said frame, a cross-bar being under each leaf, a wedge interposed between each leaf and cross-bar, and a plurality of levers pivoted to the frame, each lever being connected to a wedge.

16. A fruit-grader comprising a frame, a table supported on the frame consisting of a horizontal central portion having a plurality of pivoted leaves, a pulley rotatably mounted at one end of said table, a frame slidably mounted on horizontal bars at the other end of said first-mentioned frame, a pulley rotatably mounted on said slidable frame, a belt carried by said pulleys, the upper half of said belt lying along and supported upon said table and leaves, and means for drawing said pulley in a direction away from said first-named pulley and thereby placing said belt under tension.

17. A fruit-grader comprising a frame, a table supported on the frame consisting of a horizontal central portion having a plurality of leaves, a pulley rotatably mounted at one end of said table, a frame slidably mounted on horizontal bars at the other end of said first-mentioned frame, a pulley rotatably mounted on said slidable frame, a belt carried by said pulleys, the upper half of said belt lying along and resting upon said table and leaves, a flexible connection connected to said slidable frame, a sheave supporting said flexible connection, a weight carried by the end of said flexible connection.

18. A fruit-grader comprising means for conveying fruit along a definite line of travel, said means being inclined transversely of the line of travel, an inclined grading-rod lying along said line of travel above said conveying means, means for rotating said grading-rod, and stationary guards and deflectors mounted above said conveying means.

19. A fruit-grader comprising means for conveying fruit along a definite line of travel, said means being inclined transversely of the line of travel, an inclined grading-rod lying along said line of travel above said conveying means, means for rotating said grading-rod, and stationary guards mounted above said conveying means, each guard comprising offset walls, each wall lying in different vertical planes, the inner wall lying adjacent said grading-rod.

20. A fruit-grader comprising means for conveying fruit along a definite line of travel, said means being inclined transversely of the line of travel, an inclined grading-rod lying along said line of travel above said conveying means, means for rotating said grading-rod, guards for said conveying means, brackets connected to the frame and supporting said guards.

21. A fruit-grader comprising means for conveying fruit along a definite line of travel, said means being inclined transversely of the line of travel, an inclined grading-rod lying along said line of travel above said conveying means, means for rotating said grading-rod, and stationary guards mounted above said conveying means and a deflector adjustably mounted near said guard and movable along said guard.

22. A fruit-grader comprising means for conveying fruit along a definite line of travel, said means being inclined transversely of the line of travel, an inclined grading-rod lying along said line of travel above said conveying means, means for rotating said grading-rod, and stationary guards mounted above said conveying means, a deflector, a perforated lug thereon, a horizontal bracket mounted on said frame and parallel with said guard, said perforated lug being mounted on said bracket and a set-screw through the lug and bearing against the bracket, said deflector-plate lying at an angle to said guard.

23. A fruit-grader comprising means for conveying fruit along a definite line of travel, said means being inclined transversely of the line of travel, an inclined grading-rod lying along said line of travel above said conveying means, means for rotating said grading-rod, stationary guards mounted above said conveying means, a deflector with a perforated lug thereon, a horizontal bracket mounted on said frame and parallel with one of said guards, said perforated lug being mounted on said bracket and a set-screw through the lug and bearing against the bracket said deflector lying at an angle to said guard, and parallel with the offset part of said guard.

24. A fruit-grader having a frame, a table consisting of a depressed horizontal central portion, a plurality of leaves hinged on opposite sides, an endless belt movable along the upper surface of said table and leaves, and a relatively narrow reinforcing-belt on the inside of said main belt, said reinforcing-belt lying within said depressed central portion.

25. A fruit-grader having a frame, a table having a depressed horizontal central portion, a plurality of leaves hinged on opposite sides of the central portion, an endless belt movable along the upper surface of said table and leaves, a relatively narrow reinforcing-belt on the inside of said main belt, said reinforcing-belt lying within said depressed central portion, and a pair of opposite ridges on the outside face of said conveyer-belt.

26. A fruit-grader having a frame, a table mounted on the frame embracing a plurality of opposite hinged leaves, each leaf being provided with a concave depression along its outer edge, a conveyer-belt mounted to move along the upper surface of said table and leaves, a pair of grading-rods arranged along opposite sides of the leaves and inside of said depression, and means for rotating said grading-rods.

27. A fruit-grader comprising means for conveying fruit along a definite line of travel, said means being inclined transversely of the line of travel, a plurality of flexible inclined grading-rods lying along said line of travel above said conveying means, means for rotating said grading-rods, means for feeding fruit to one end of said conveying means, and a deflector at the other end of said conveying means.

28. A fruit-grader comprising means for conveying fruit along a definite line of travel, said means being inclined transversely of the line of travel, an inclined grading-rod lying along said line of travel above said conveying means, means for rotating said grading-rods, means for feeding fruit to one end of said conveying means, a deflector at the other end of said conveying means, a trough having a mouth arranged adjacent said deflector, said trough extending below the upper part of the belt, and having its discharge-spout arranged above the central part of the lower part of the conveyer means.

29. A fruit-grader comprising means for conveying fruit along a definite line of travel, said means being inclined transversely of the line of travel, an inclined grading-rod lying along said line of travel above said conveying means, means for rotating said grading-rod, means for feeding fruit to one end of said conveying means, means at the other end of said conveying means for transferring fruit from the retaining portion of said conveying means, a longitudinal trough mounted above the retaining or lower part of said conveying means.

30. A fruit-grader comprising means for conveying fruit along a definite line of travel, said means being inclined transversely of the line of travel, an inclined grading-rod lying along said line of travel above said conveying means, means for rotating said grading-rod, means for feeding fruit to one end of said conveying means, means at the other end of said conveying means for transferring fruit to the returning portion of said conveying means, a longitudinal trough mounted above the returning or lower part of said conveying means, an auxiliary conveyer connecting with the rear end of said last-named trough, said auxiliary comprising an endless belt mounted on a pair of pulleys, and means for driving said pulleys.

31. A fruit-grader comprising a frame, a pulley mounted in each end of said frame, a belt mounted on said pulleys, a conveyer-belt connected to said first-named belt, means for supporting the outer portions of said conveyer-belt in inclined positions, a pair of grading-rods mounted above said conveyer-belt, each rod being near the outside edge of the conveyer-belt and slightly above the belt, the space between the rods and the belt at the feeding end of said belt being less than the distance between said rods and said belt at points beyond said feeding end, and means for rotating said rods in opposite directions.

32. A fruit-grader comprising means for conveying fruit along a definite line of travel, said means being inclined transversely of the line of travel, an inclined grading-rod lying along said line of travel above said conveying means, means for rotating said grading-rod, means for feeding fruit to said conveying means comprising an inclined trough, an oscillatory feed-regulator mounted transversely of said trough, said feed-regulator comprising a pair of segmental curved plates concentric with the axis of said feed-regulator, a pair of flat plates mounted on the upper edges of said curved plates, the free edges of said flat plates being at angles to each other, and means for oscillating said feed-regulator.

33. A fruit-grader comprising means for conveying fruit along a definite line of travel, said means being inclined transversely of the line of travel, an inclined grading-rod lying along said line of travel above said conveying means, means for rotating said grading-rod, means for feeding fruit to said conveying means comprising an inclined trough, an oscillatory feed-regulator mounted transversely of said trough, said feed-regulator comprising a pair of segmental curved plates concentric with the axis of said feed-regulator, a pair of flat plates mounted on the upper edges of said curved plates the free edges of said flat plates being at angles to each other, and means for oscillating said feed-regulator, the axis of said feed-regulator being substantially in a line with the bottom of said inclined trough.

34. A fruit-grader comprising means for conveying fruit along a definite line of travel, said means being inclined transversely of the line of travel, means for grading fruit lying along said line of travel above said conveying means and having its axis inclined, means for feeding fruit to said conveying means embracing an inclined trough, an oscillatory feed-regulator extending transversely of said inclined trough, means for oscillating said feed-regulator, and a balanced tilting table mounted above said inclined trough.

35. A fruit-grader comprising a frame, a table supported by the frame embracing a horizontal portion, inclined hinged leaves, a pulley mounted on each end of the frame, a belt carried by the belt, said belt movable along over the upper faces of said table and leaves, means for feeding fruit to the upper face of said belt at one end, means at the other end of said belt for transferring fruit from the upper face of the belt to the lower part of the belt, a trough extending along the upper side of the lower part of said belt, said trough being slightly above the belt and at its rear end being offset and extending beyond the edge of the belt, and a pair of relatively short auxiliary troughs parallel with the main part of the longitudinal trough and adjacent the offset of the main trough.

36. A fruit-grader comprising means for conveying fruit along a definite line of travel, said means being inclined transversely of the line of travel, an inclined grading-rod lying along said line of travel above said conveying means, means for rotating said grading-rod, a series of bins arranged along each side of the conveying means and means for adjusting portions of said grading-rod to various heights above the conveying means adjacent to each bin.

37. A fruit-grader comprising means for conveying fruit along a definite line of travel, said means being inclined transversely of the line of travel, an inclined grading-rod lying along said line of travel above said conveying means, means for rotating said grading-rod, means for supporting said conveying means embracing a table consisting of a central horizontal portion and a plurality of inclined hinged leaves arranged along each side of the horizontal part, a plurality of bins for the respective leaves, a bin being arranged adjacent each leaf, means for adjusting each leaf independently of the others, a plurality of guards for the respective bins, each of said guards extending considerably each side of the partition between two bins.

38. A fruit-grader comprising means for conveying fruit along a definite line of travel, said means being inclined transversely of the line of travel, an inclined grading-rod lying along said line of travel above said conveying means, means for rotating said grading-rod, means for feeding fruit to said conveying means comprising an inclined trough, an oscillatory feed-regulator rotatably mounted in said inclined trough, said feed-regulator comprising a pair of segmental curved plates concentric to the axis of said feed-regulator, a pair of flat plates, each plate being provided with elongated slots, screws passing through said slots and fastening said flat plates to said curved plates, and means for rocking said feed-regulator.

39. In a device of the character described, means for feeding fruit thereto consisting of an inclined trough, an oscillatory feed-regulator arranged transversely of said trough, said feed-regulator comprising a pair of curved segmental plates concentric with the axis of said feed-regulator, and a pair of flat plates adjustably secured at angles to said curved plates, and means for rocking said feed-regulator.

40. In a fruit-grader, a frame, a driving-shaft mounted at one end of the frame, a slidable regulating-frame mounted on horizontal bars of the main frame, a shaft mounted on said slidable frame, a pulley mounted on the latter shaft, a pulley mounted on the driving-shaft, a conveyer-belt mounted on the two pulleys, a second shaft mounted on the frame, a pair of grading-rods extending longitudinally of said conveyer-belt, each rod being spaced slightly above the belt and inclined, a pair of pulleys on the second driving-shaft, a pulley on the rear end of each grading-rod, a belt connecting each of said pulleys with pulleys on the second driving-shaft, an auxiliary conveyer comprising a pair of pulleys, a belt connecting said pulleys, said auxiliary conveyer lying parallel to said conveyer-belt, bins arranged along each side of the conveyer-belt, guards in front of each bin, said guards embracing a plate offset to form two parallel planes, a horizontal bracket mounted on the outer edge of a leaf, an adjustable deflector comprising a plate provided with a perforated lug, said lug being slidably mounted on said bracket and a set-screw passing through said lug and fastening the same to said bracket.

41. In a fruit-grader, a frame, a driving-shaft mounted at one end of the frame, a slidable regulating-frame mounted on horizontal bars of the main frame, a shaft mounted on said slidable frame, a pulley mounted on the driving-shaft, a traveling belt mounted on the two pulleys, a second driving-shaft mounted on the frame, a pair of grading-rods extending longitudinally of said belt, each rod lying near and spaced slightly above the belt, each rod being inclined, a pair of pulleys on the second driving-shaft, a pulley on the rear end of each grading-rod, a belt connecting each of said pulleys with pulleys on the second driving-shaft, an auxiliary conveyer comprising a pair of pulleys and a belt connecting said pulleys, said auxiliary conveyer lying parallel to said conveyer-belt, bins arranged along each side of the conveyer-belt, guards in front of each bin, a guard embracing a plate offset to form two parallel planes, a plurality of brackets, a bracket being mounted on the edge of each leaf, an inclined deflector-plate having a perforated lug, said lug being mounted on a bracket, the plane of said plate being parallel to the offset angular portion of the guard near which said deflector-plate is attached.

In testimony whereof I have signed my name to this specification, in the presence of two subscribing witnesses, at Los Angeles, in the county of Los Angeles and State of California, this 7th day of January, 1903.

THOMAS STRAIN.

Witnesses:
GEORGE T. HACKLEY,
JULIA TOWNSEND.